(12) United States Patent
Allen et al.

(10) Patent No.: US 9,268,971 B2
(45) Date of Patent: Feb. 23, 2016

(54) SECURE PROCESSOR SUPPORTING MULTIPLE SECURITY FUNCTIONS

(75) Inventors: Douglas Allen, San Francisco, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1887 days.

(21) Appl. No.: 11/524,517

(22) Filed: Sep. 21, 2006

(65) Prior Publication Data

US 2007/0168048 A1    Jul. 19, 2007

Related U.S. Application Data

(60) Provisional application No. 60/718,999, filed on Sep. 21, 2005.

(51) Int. Cl.
*H04L 29/06* (2006.01)
*G06F 21/74* (2013.01)
*G06F 21/71* (2013.01)

(52) U.S. Cl.
CPC ............... *G06F 21/74* (2013.01); *G06F 21/71* (2013.01); *G06F 2221/2105* (2013.01)

(58) Field of Classification Search
CPC .................................. G06F 21/57; G06F 21/53
USPC .............. 713/164–167, 187, 200–201; 726/5
See application file for complete search history.

(56) References Cited

U.S. PATENT DOCUMENTS

| | | | |
|---|---|---|---|
| 2002/0089528 A1* | 7/2002 | Hay et al. ...................... | 345/712 |
| 2004/0003288 A1* | 1/2004 | Wiseman et al. ............. | 713/201 |
| 2006/0107032 A1 | 5/2006 | Paaske et al. | |
| 2006/0256108 A1* | 11/2006 | Scaralata ...................... | 345/418 |
| 2007/0130472 A1 | 6/2007 | Buer et al. | |
| 2007/0174616 A1 | 7/2007 | Buer | |

* cited by examiner

*Primary Examiner* — Anthony Brown
(74) *Attorney, Agent, or Firm* — Sterne, Kessler, Goldstein & Fox P.L.L.C.

(57) ABSTRACT

A secure processor such as a trusted platform module supports multiple security functions within a single secure processing environment. For example, the secure processor may be configured to perform functions in accordance with the TPM specification and to perform other, non-TPM, security functions. These security functions may be operated independently such that the operation of one security function does not violate or compromising the security of other security functions.

20 Claims, 5 Drawing Sheets

SECURE PROCESSOR SUPPORTING MULTIPLE SECURITY FUNCTIONS

CROSS-REFERENCE TO RELATED APPLICATION(S)

This application claims the benefit of U.S. Provisional Application No. 60/718,999, filed Sep. 21, 2005, the disclosure of which is incorporated by reference herein.

TECHNICAL FIELD

This application relates to secure processing and, more specifically, to a secure processor that supports multiple security functions.

BACKGROUND

A variety of security techniques are known for protecting information in and controlling the operation of a computing device such as a personal computer, a server or a mobile device. For example, physical and/or cryptographic techniques may be employed to control access to the computing device and to data stored in the computing device. Physical security techniques may include locating the computing device in a secure location, locking the computing device in an enclosure, protecting integrated circuits (i.e., chips) from invasive monitoring by encapsulating the chips in, for example, an epoxy.

Cryptographic techniques may include one or more of encryption, decryption, authentication, signing and verification. In some applications data encryption and decryption techniques may be used to prevent unauthorized applications or persons from accessing data stored in the computing device. For example, security passwords that are used to restrict access to a PC may be stored on the PC in an encrypted form. The operating system may then decrypt the password when it needs to compare it with a password typed in by a user.

In practice, there may be circumstances during which the use of secret credentials such as a password or cryptographic key may be compromised. For example, when a user uses a computing device to access confidential information, the user may first need to enter the secret credentials into the computing device. The computing device may process these credentials to determine whether the user is authorized to access the confidential information.

In the event the computing device has been comprised (e.g., by a hacker or code such as a computer virus, spyware, a Trojan horse, etc.) an unauthorized person may gain access to these credentials. As a result, an unauthorized person may be able to access the confidential information. Serious consequences may result when the confidential information includes sensitive information such as financial data or personal information.

In response to concerns such as these, the Trusted Computing Group ("TCG") developed a specification for a trusted platform module ("TPM"). In general, a TPM provides a mechanism to securely generate and maintain keys used by an associated system (e.g., a computer within which the TPM is embedded). The TPM may be configured such that the TPM only uses keys when the TPM has verified that the keys are protected and the system has not been compromised. For example, the TPM may use a secure boot procedure and may only execute authenticated code.

A TPM may incorporate physical means of protection. For example, all of the functionality of the TPM may be implemented within a single integrated circuit. In addition, the TPM hardware may be protected using tamperproof and/or tamper evident techniques such as epoxy encapsulation.

A TPM also may use cryptographic techniques to protect information that it stores outside of the TPM. For example, the TPM includes at least one cryptographic processor that may be used, for example, to encrypt cryptographic keys or other sensitive data before the TPM stores the data in a data memory located outside of the TPM. Moreover, the TPM may not expose the keys used for this encryption outside the boundary of the TPM. For example, the TPM may never allow the encryption/decryption key to leave the TPM boundary.

In a conventional TPM application, the TPM generates and maintains keys for a user. For example, a user authorized to use the system within which the TPM is implemented may request the TPM to generate a key (hereafter referred to as the "user key"). Here, the TPM may require the user to create a password associated with the user key. The TPM will thus only enable use of the user key upon verification of the password. After the TPM generates the user key the TPM uses another key to encrypt the user key. This enables the TPM to securely store the user key outside of the TPM. This higher level key also may be encrypted and stored outside the TPM.

When a user wishes to use the user key (e.g., to encrypt or decrypt data), the user (e.g., via an application) sends the data to an encryption/decryption application and sends the password to the TPM. The TPM receives the appropriate higher level key (which is normally stored in external memory), uses an internal cryptographic processor to decrypt the key, then releases the key to the encryption/decryption application.

Similarly, when a user uses the TPM to sign data with the user key, the user sends the data and the password to the TPM. Again, TPM receives the appropriate higher level key (normally stored in external memory) and uses an internal cryptographic processor to decrypt the user key. Next, the TPM uses the user key in an internal cryptographic processor to sign the data. The TPM then sends the signed data to the user (e.g., to the user's application).

One advantage of a TPM-enabled system is that in the event the system is stolen, the thief may not be able to access the keys protected by the TPM. Consequently, the thief may not be able to access any information protected by those keys.

BRIEF DESCRIPTION OF THE DRAWINGS

These and other features, aspects and advantages of the invention will be more fully understood when considered with respect to the following detailed description, appended claims and accompanying drawings, wherein:

Further embodiments, features, and advantages of the present invention, as well as the operation of the various embodiments of the present invention, are described below with reference to the accompanying drawings.

DETAILED DESCRIPTION

Figure 1:
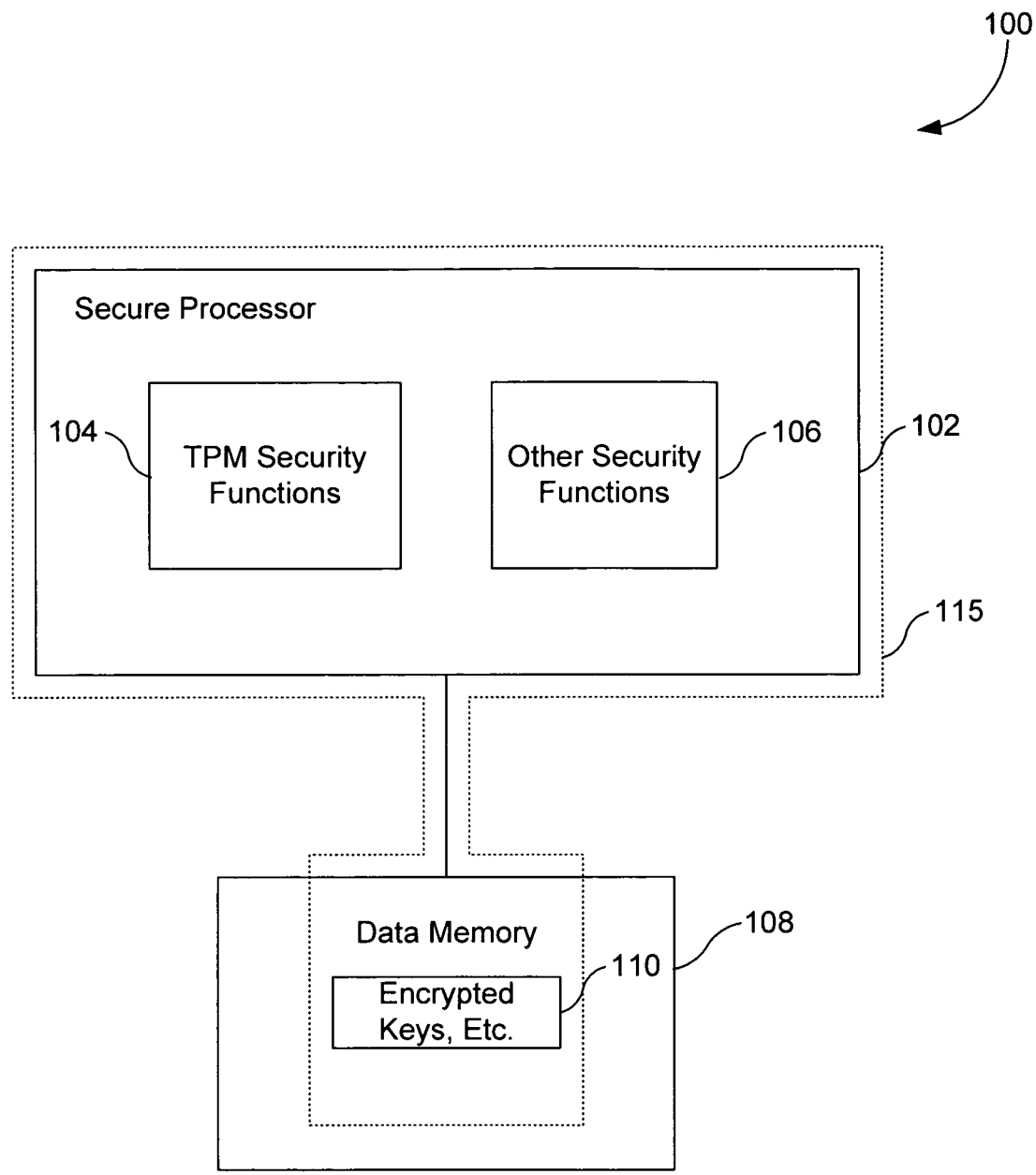
FIG. 1 is a block diagram of a system constructed in accordance with an embodiment of the invention.

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications FIG. 1 illustrates one embodiment of a secure processing system 100 including a secure processor 102 that may be configured to support TPM security functions 104 and non-TPM security functions 106. For example, the secure processor 102 may be TPM compliant in accordance with Trusted Computing Group specifications. Here, the secure processor processes commands and implements functions in accordance with the TPM specification to support TPM-related applications. Accordingly, the secure processor may be referred to herein as a TPM.

In addition, the secure processor is configured to implement one or more other security functions 106 to support non-TPM compliant applications. Here, the secure processor may manage keys and perform other cryptographic processes for the non-TPM security applications. Because functions 106 are not TPM compliant and may not be addressed by the TPM standard, security functions 106 are said to be independent of the TPM standard.

TPM applications and non-TPM applications may operate independently of one another even though these applications share the processing capability of the TPM. Here, the TPM may be configured so that the operation of the non-TPM applications does not materially affect the operation of the TPM applications. Due, in part, to the method of implementing non-TPM operations as taught herein, non-TPM operations may not operate on or affect the data used by the TPM operations. For example, non-TPM operations may not cause the data and operations of the TPM to be exposed outside of the TPM. Thus, the commands associated with a non-TPM application may be implemented such that they do not violate or compromise the security of the TPM. In this way, the TPM path may be certified as TPM compliant even though the TPM supports other non-TPM functionality.

In addition, non-TPM operations may be implemented such that the TPM, and only the TPM controls the set of keys ("key space") used within the TPM, including keys used for non-TPM operations. For example, the TPM may use standard TPM functions to create and manage the keys used by the TPM and non-TPM applications. Managing keys may include, for example, creating keys, loading and evicting keys, establishing and enforcing key authorization parameters to restrict use of the keys, certifying keys to external entities and supporting migration of keys between different computing entities.

At least a portion of the keys managed by the secure processor are stored in encrypted form in one or more external data memories, hereafter referred to as data memory 108. Here, the TPM encrypts keys and associated data before they are stored in the data memory 108, and decrypts the encrypted keys and associated data 110 it receives from the data memory 108. Accordingly, as represented by the dashed line in FIG. 1, a security boundary 115 is established by the TPM including, for example, the chip within which the TPM is implemented and the encrypted keys and associated data in the data memory.

Figure 2:
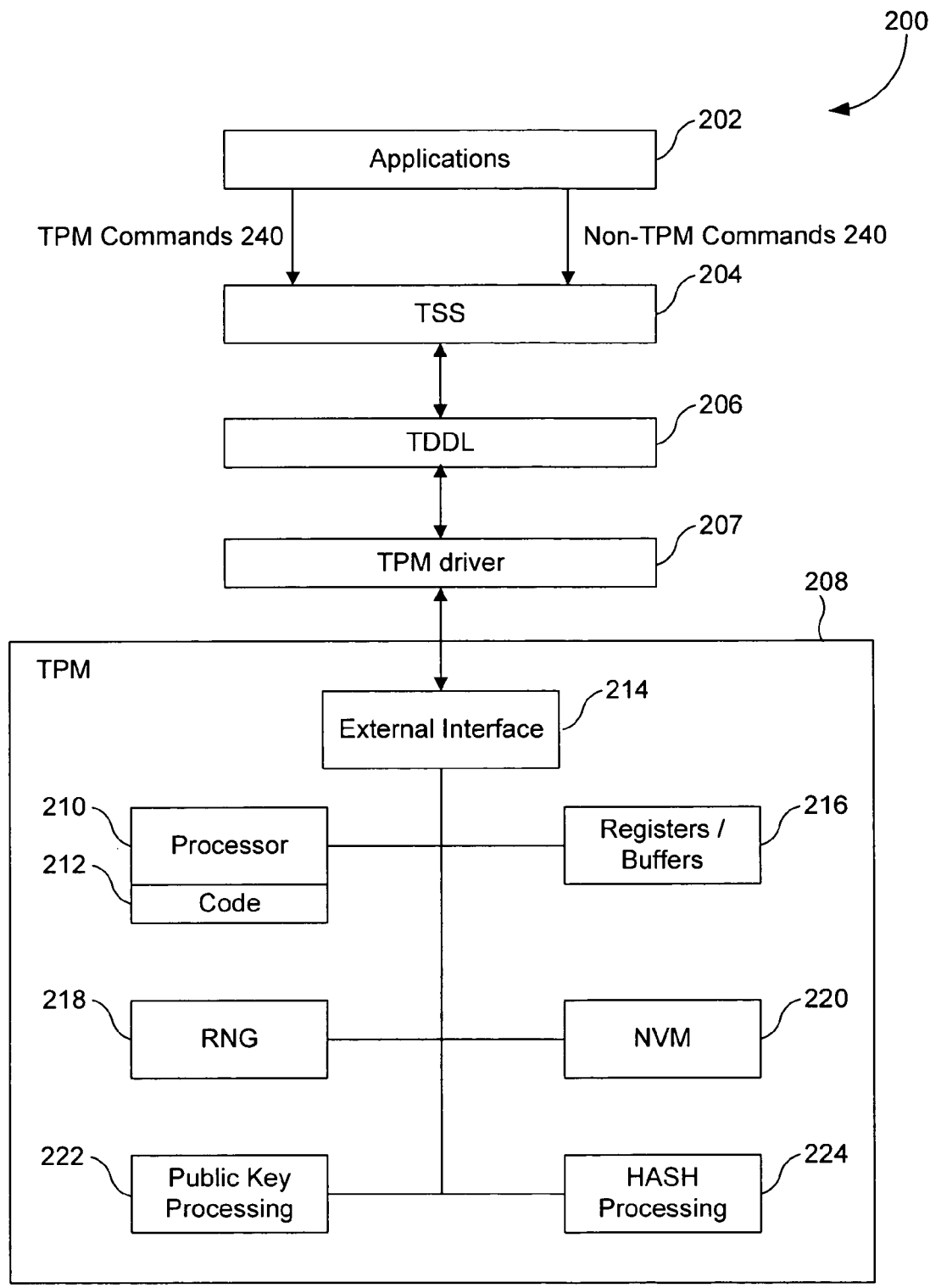
FIG. 2 is a block diagram of one embodiment of a trusted platform module.
Figure 3:
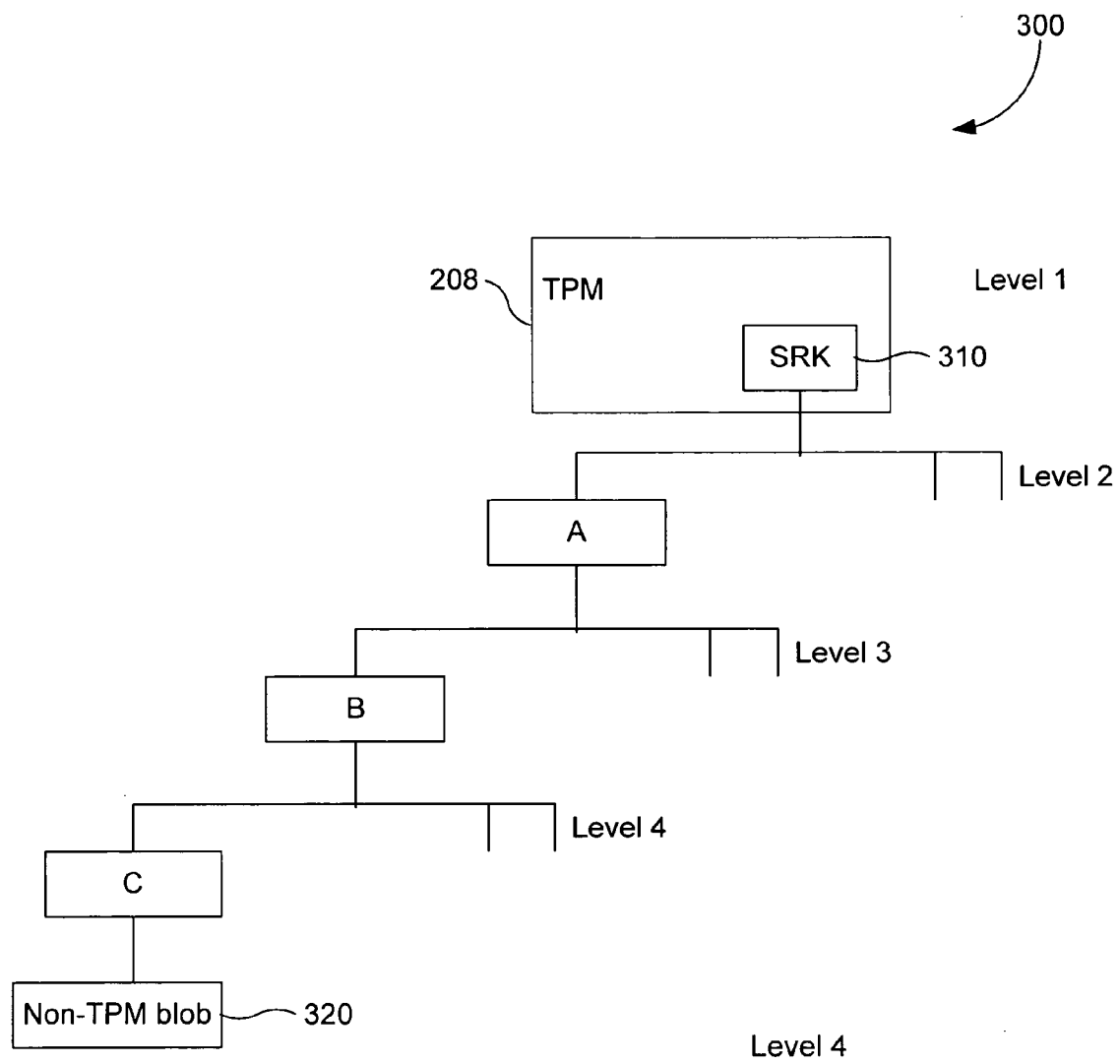
FIG. 3 is a diagram of one embodiment of a key hierarchy in accordance with the invention.
Figure 4:
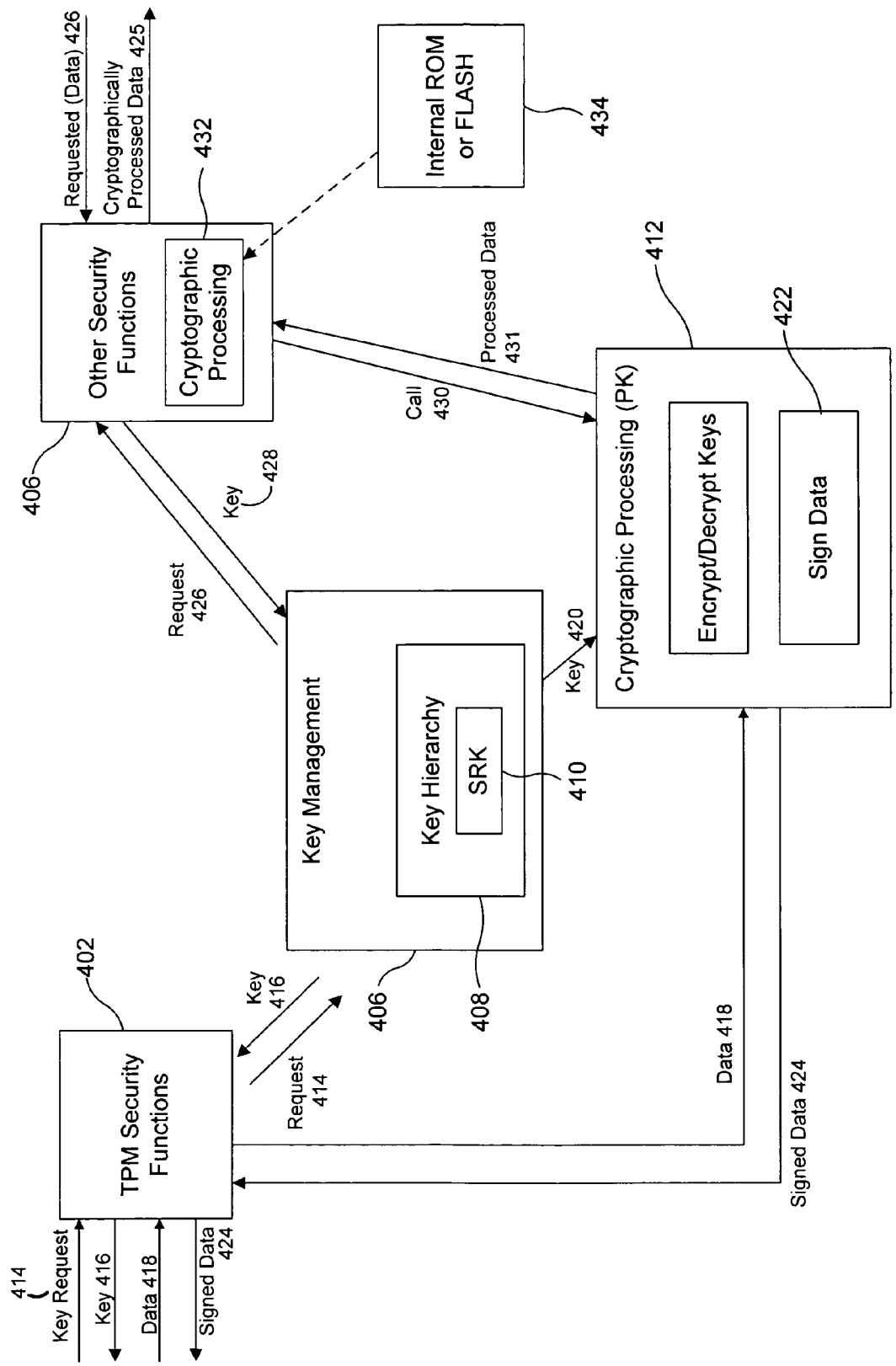
FIG. 4 is a block diagram of one embodiment of system incorporating a trusted platform module constructed in accordance with the invention.

These and other aspects of a secure processor as taught herein may be better understood with reference to FIGS. 2-4. FIG. 2 illustrates one embodiment of interactions between hardware, firmware and software in a TPM, and components associated with the TPM. FIG. 3 depicts one embodiment of a TPM key hierarchy. FIG. 4 illustrates one embodiment of functional components in a TPM configured to support other secure processing functionality.

In FIG. 2 a trusted software stack (TSS) 204 provides an interface that enables applications 202 running on an associated device (e.g., a computer) to call into a TPM. Appropriate commands, TPM commands 240 and non-TPM commands 250, are thereby issued to TPM device driver 207, which interacts with TPM hardware 208. TPM commands 240 represent commands that are specified in and comply with the TPM standard. Non-TPM commands 250 represent commands that are not addressed by or are not in compliance with the standard. The latter commands are said to be independent of the TPM standard.

The TPM 208 includes a processor 210 that executes code 212 to implement the various functions required of the TPM 208. An external interface 214 allows the applications executing on a local host (not shown) to send commands 240 and 250 to the TPM 208, receive responses from the TPM 208 via the software and firmware components 202-206.

The TPM 208 includes a random number generator (RNG) 218 that generates random numbers used to generate asymmetric keys. Note that RNG 218 may actually be a deterministic pseudorandom number generator in an embodiment of the invention. As will be discussed in more detail below, the TPM 208 maintains an endorsement key (EK) that the TPM 208 uses to attest to external entities as to the security of the TPM. As will be discussed in more detail below the TPM 208 also maintains a private storage root key (SRK) that may be used to protect a key hierarchy managed by the TPM 208. The TPM may store the EK and SRK in a nonvolatile memory (NVM) 220. Alternatively, the TPM 208 may store these keys external to the TPM (not shown). The TPM 208 may also create identity keys that may be used to certify keys to external entities.

The TPM includes a public key processing component 222 that supports public key algorithms such as RSA and digital signature algorithms such as DSA. The public key processing component 222 encrypts and decrypts asymmetric keys that are managed by the TPM 208 as discussed above. The public key processing component 222 also signs data for a user as discussed above. Public key values generated by the TPM 208 may be read from the TPM via the external interface 214.

The TPM 208 also includes a hash processing component 224 that supports hash algorithms such as SHA-1. The TPM 208 uses SHA-1 in conjunction with digital signal operations.

Referring now to FIG. 3, it is shown that the SRK 310 is the root key of a key hierarchy 300. The TPM 208 uses the SRK 310 to encrypt keys at a next lower level (e.g., level 2) in the key hierarchy 300. In an embodiment of the invention, the TPM 208 generates the SRK 310 when a user takes ownership of the TPM 208 and never allows the SRK 310 to leave the secure boundary associated with TPM 208. Hence, the TPM 208 provides a high level of protection for any keys protected by the SRK 310.

The TPM 208 uses keys at level 2 of the hierarchy 310 to encrypt keys at a next lower level (e.g., level 3) and so on. This hierarchical technique provides, for example, a secure mechanism for providing keys for different applications.

To keep the size of the TPM as small as possible, a structure including the key and any associated data (referred to herein as a "key blob") are stored in external data memory. A key blob typically includes some information that is sensitive from a security perspective and some that is not sensitive. Accordingly, a TPM may only encrypt the sensitive information. A stored key blob may thus contain encrypted data and non-encrypted data.

When a user or application needs to use a key, the TPM 208 may initially need to load in and decrypt all of the keys above that key in the hierarchy 300. For example, to use a target key (key C), the TPM 208 may first load in the key from level 2 (e.g., key A), decrypt that key using the SRK 310, then load in the appropriate level 3 key (e.g., key B), decrypt key B using key A, then load in key C to be decrypted using key B.

In practice, the TPM 208 may implement measures to more efficiently gain access to the target key once the key has been accessed. Here, the user has proven that he has access to a given key. Accordingly, the TPM may store the key blob in a different format, a context blob. The TPM encrypts the context (e.g., using the key from the next higher level) except for context identification information. Software external to the TPM may then manage the resource by saving off the context and reloading it as necessary. As a result it is not necessary to load all of the keys in the upper layers of the hierarchy to use a key blob context. Rather, the next time the user requests to use the target key, the TPM may invoke a relatively simple swapping technique to load in and decrypt the corresponding key blob context.

As discussed above, the TPM may be configured to use conventional TPM functionality to manage keys for non-TPM functions. Some non-TPM functions may use algorithm-specific parameters such as a seed, a key, etc. Accordingly, one or more structures (referred to herein as a token or a non-TPM blob) including these parameters may be defined for a given non-TPM function.

In some embodiments the TPM 208 is configured to manage a non-TPM blob 320 whereby a parent key of the non-TPM blob 320 is used for loading and operating upon the non-TPM blob. Here, the parent key (e.g., key C in FIG. 3) of non-TPM blob 320 has attributes that are similar to the attributes of a key blob in normal TPM operations. In this way, the TPM 208 may treat the parent key C of a non-TPM blob 320 in the same way, hierarchically, as it treats a key blob in TPM operations. This approach enables the non-TPM operations to be efficiently and securely implemented within the TPM structure.

For example, the TPM may manage loading and evicting of the parent key in the same way as any other key. Thus, the TPM may use its normal operations and resources to load and evict a key regardless of whether the key relates to a typical TPM-related operation or a non-TPM operation. This may thus avoid, for example, the need for using dedicated TPM internal memory for storage of non-TPM operation-specific keys or the need for custom commands or operations to load and evict non-TPM operation-specific keys. Moreover, a non-TPM parent key may be efficiently loaded (after the first load) using the standard TPM swapping technique discussed above. Such key management operations involving keys that are associated with a non-TPM blob are referred to herein as operations in support of non-TPM functions.

In addition, the TPM may use similar user authorization operations for the parent key and TPM keys. For example, a TPM typically incorporates a mechanism to associate use authorization (e.g., a password) with a given key. In conjunction with this mechanism, provisions may be made to enable certain users to access a given key and to enable the associated authorization parameter (e.g., password) to be changed. Through the use of similar key structures for TPM and non-TPM operations, such authorization capabilities may be provided for non-TPM operations without the need for non-TPM operation-specific resources (e.g., custom commands, key resources, etc.). These capabilities may thus be used to indirectly (via the non-TPM parent key) provide authorization control for a non-TPM blob.

Some embodiments may support migration of the non-TPM operations. For example, a user may be allowed to, in effect, move the non-TPM algorithm and current parameter data from one computing device to another computing device. In this case, through the use of similar key structures for TPM and non-TPM operations, such migration capabilities may be provided for non-TPM operations without the need for non-TPM operation-specific resources.

The above non-TPM-related operations may be performed using standard TPM commands. For example, a TPM change authorization command may be invoked to set user authorization parameters. A TPM create key command may be invoked to generate a non-TPM parent key. A TPM load key command may be used to load a non-TPM parent key into the TPM. In addition, a TPM delegate command may be used to delegate the use of a non-TPM parent key to another user. This command may thus indirectly delegate the use of the non-TPM blob to the other user. Various operations such as revoking the delegation may be associated with the delegation command.

By using at least some of the same commands for TPM and non-TPM operations, system resources (e.g., code space) may be saved since it is not necessary to replicate those functions for the non-TPM operations. In addition, the processor executing the operations does need to interpret whether a given command is a TPM command or a non-TPM command. Moreover, the processor may not need to be configured to enforce different rules associated with different types of commands.

In some embodiments, at least a portion of the non-TPM operations are invoked by separate non-TPM commands. Thus, TPM commands are provided to the TPM to invoke TPM operations while non-TPM commands and TPM commands may be provided to the TPM secure processor to invoke non-TPM-related operations.

The keys may be managed using the same trusted software stack normally used by the TPM. Accordingly, non-TPM operations may be added to a TPM without requiring the TSS to identify all commands as either TPM-specific or non-TPM-specific.

In some embodiments the commands may be provided to the TPM via the same bus, referred to herein as the TPM command bus. However, the different commands may result in different, e.g., totally separate and isolated, processing within the TPM.

These and other aspects a TPM that supports TPM and non-TPM functionality may be better understood with reference to the processing and data flow described in FIG. 4. FIG. 4 depicts functional blocks, as opposed to physical blocks, relating to operations that may be performed and data flow when servicing a TPM command or a non-TPM command. Depending on the type of command invoked, the TPM may call functions 402 that perform TPM-specific command processing or functions 404 that perform non-TPM command processing.

The TPM command processing may, in effect, invoke a request 414 to a key management component (e.g., a key cache) 406 to create, manage or load a key for a TPM operation. As discussed above, the TPM stores keys in a key hierarchy 408 based on an SRK 410.

Many of the TPM commands involve a request to the TPM to perform basically an internal operation. That is, such commands do not request the TPM to perform a cryptographic operation and output the result. For example, a request to create or otherwise manage a key may simply involve sending a command with a corresponding key identifier and other parameters. The TPM then performs various stand-alone operations such as generating a random number, loading or evicting keys from/to a data memory, using a public key processing component 412 to encrypt or decrypt a managed key, etc.

Two types of TPM commands involve a request to the TPM to perform a cryptographic operation and output the result. In each case the command will reference a key managed by the TPM (hereafter referred to as the "target key") that the TPM is to use to perform the cryptographic operation. The key management component thus invokes the public key (PK) processing component 412 to decrypt one or more keys of the key hierarchy that are physically stored in an external data memory. In particular, the TPM loads in the appropriate key (hereafter referred to as the "decryption key") to decrypt the target key 420. Accordingly, the TPM receives the encrypted target key 420 that is stored in the data memory, and passes it to the public key processing component 412. The public key processing component 412 uses the decryption key to decrypt the target key 420.

As discussed above, the TPM-specific functionality may be used to either pass back the target key 420 in the clear to the application or may use the target key 420 to sign data 418 provided by the user. If the received command was a key request 414, the TPM simply passes the clear text key 416 (the decrypted version of target key 420) back to the application (e.g., via the TSS). This would be the case if the TPM has been used to wrap an application-provided key 416. In this case, the application provided key 416 is not used by the TPM; the key 416 is just wrapped and unwrapped (encrypted/decrypted) based on an application request.

If the received command was for an asymmetric signing operation, the TPM would have received one or more blocks of data 418 from the application. The TPM passes this data to the public key component 412 so that the public key component may use the target key 420 in conjunction with a signing algorithm (e.g., DSA) 422 to sign the data 418. The TPM then passes the signed data 424 back to the application (e.g., via the TSS).

As discussed above, non-TPM operations may utilize some of the standard TPM commands. For example, an application may call a standard TPM command to create and manage a key. It should be appreciated that certain efficiencies may result from this approach. For example, no new commands are required for these tasks. The commands are handled in the same manner at the software level and within the TPM. The standard TPM key management component manages all key space, including loading keys into the TPM, evicting keys from the TPM, etc. Moreover, these commands may have no impact on the security of the TPM since any operations that may affect the TPM-specific components and data are performed by the standard TPM components.

Similarly, the non-TPM commands may be implemented in a manner that does not affect the security of the TPM or affect key management operations. Referring again to FIG. 4, one of functions 404 called in response to a non-TPM command 426 may use a key managed by the TPM. Such a function may be configured to use the conventional TPM functionality to obtain the key 428. Hence, TPM key management and integrity are not compromised. In addition, the function may invoke a separate call 430 to use a TPM cryptographic processing component (e.g., the public key processing component 412 or the hash processing component described above). Similarly, the non-TPM functionality may perform other types of cryptographic operations (e.g., symmetric key cryptographic algorithms or authentication processes) 432 using code loaded in from an internal executable code space or an external memory such as flash 434. Such code may be securely loaded, authenticated and executed by the TPM as described, for example, in U.S. patent application Ser. No. 11/250,265, filed Oct. 13, 2005, the disclosure of which is incorporated by reference herein. Accordingly, any unique cryptographic functions may be implemented in a manner that does not affect the security of the TPM. Further, the non-TPM functionality may not expose keys and data used by TPM outside the TPM, since the non-TPM functionality may not access these keys and data. As a result, the TPM remains compliant with the TPM specification.

Figure 5:
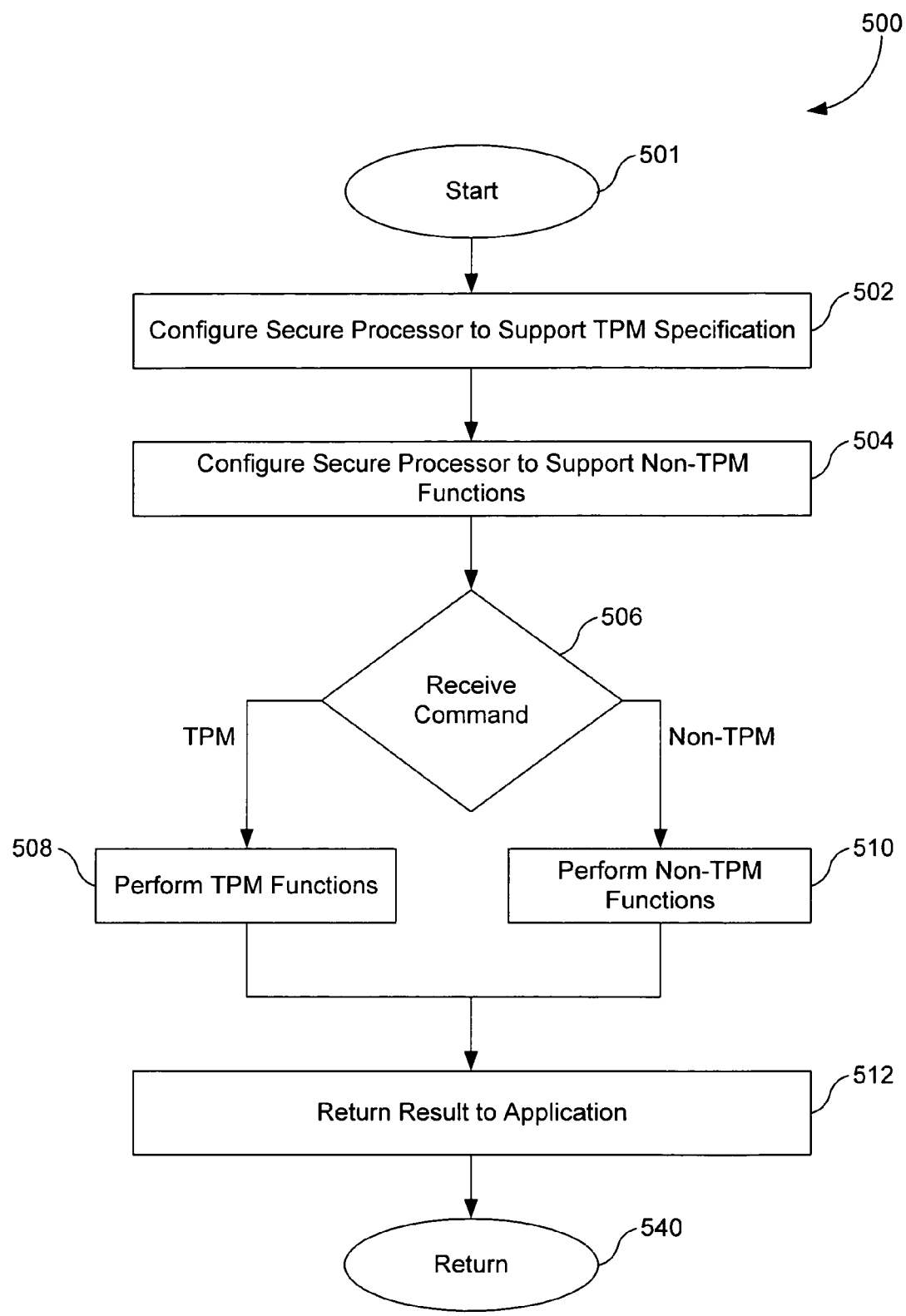
FIG. 5 is a flow chart of operations performed in accordance with an embodiment of the invention.

Referring now to FIG. 5, one embodiment of operations that may be performed in conjunction with non-TPM operations will be described in more detail. The process begins at step 501. As represented by block 502, initially the secure processor is configured to perform security functions in accordance with a cryptographic specification or standard such as the TPM specification. Accordingly, the secure processor is configured with appropriate hardware as discussed herein, the secure processor may be physically protected, code that supports the TPM command structure and operations is installed and appropriate keys are generated, etc. One or more of these operations may be performed when an integrated circuit within which the TPM is implemented is manufactured and configured. Similarly, one or more of these operations may be performed when the integrated circuit is installed in a computing device (e.g., a computer).

As represented by block 504, the secure processor is configured to provide other non-TPM security functions. This may involve, for example, loading executable code and associated data into an internal execution memory or installing the code in an external memory such as flash. This code and data may include, for example, a function table, functions called in response to a non-TPM command, and routines called by those functions such as cryptographic algorithms and verification routines. The cryptographic algorithms may relate to symmetric or asymmetric operations and to one or more of encryption, decryption, authentication, verification and signing. In addition, the secure processor may generate one or more keys for non-TPM security functions and store these keys and associated attributes within the construct of the TPM key hierarchy.

After the secure processor has been initialized and normal operations commenced, the secure processor and associated firmware and software handles any incoming commands from the applications operating on an associated computing device (block 506). In the case of TPM commands, the secure processor performs the standard TPM functions (block 508). In the case of non-TPM commands, the secure processor performs the associated non-TPM functions (block 510). This may include, for example, operating on data (e.g., keys, encrypted information, clear text information, etc.) using algorithms other than those supported by the TPM specification.

As represented by block 512, the secure processor may return a result to the application. For non-TPM commands this may include, for example, returning data that has been processed using operations not supported by the TPM specification. The process concludes at step 540.

A secure processor as taught herein may be used in a variety of applications. For example, a secure processor may be incorporated in a variety of computing devices such as computers (e.g., laptops, servers, desktops, etc.), phones (e.g., cell phones), personal data assistants, entertainment devices, etc. In some embodiments the TPM may be implemented on a network interface such as a Gigabit Ethernet controller in a computing device. Here the controller may be implemented in a network interface card ("NIC"), as part of a LAN-on-Motherboard ("LoM") solution or another configuration.

A variety of non-TPM security functions may be supported by a TPM as taught herein. Here, functions that may otherwise be performed external to the TPM may be securely performed within the security boundary associated with the TPM. Such other security functions may relate to, for example and without limitation, generating a one-time-password, generating keys for Alert Standard Format ("ASF") processes, encrypting data, decrypting data, authenticating data, digital rights management processes, verifying data, etc. Several of these functions will now be discussed in more detail.

In some embodiments a TPM supports non-TPM security functions that involve performing a symmetric cryptographic operation on data provided by a requester (e.g., an application, a user, etc.) and returning the result of that operation to the requester. For example, the TPM may encrypt or decrypt the input data using a symmetric algorithm such as DES, 3DES, etc., and return the resulting encrypted or decrypted data to the requester.

In some embodiments the non-TPM security functions involve performing a verification operation on data provided by a requester and returning the result of the verification to the requester. Such a function may, in general, involve any operation that determines whether a set of data was operated on in an expected manner. For example, the TPM may use an asymmetric algorithm to verify a digital signature and send a response to the requester indicative of whether the signature was verified.

Alternatively, the operation may involve symmetric verification. For example, the TPM may verify whether a password sent by the requester matches an expected password (e.g., as maintained by the TPM) and send a response to the requester indicative of whether the correct password was submitted. Alternatively, the TPM may digitally sign data using a symmetric digital signature technique and output the signed result.

In some embodiments the non-TPM security functions involve performing a hashrelated operation on data provided by a requester and returning the hash result to the requester. Such hash operations may include, for example, SHA-1, MD5 and an HMAC based on either SHA-1 or MD5.

In some embodiments the non-TPM security functions involve generating a one-time-password. For example, a one-time-password blob may consist of parameters (e.g., a seed, a count, a key, etc.) used by a one-time-password algorithm. An application may then invoke a non-TPM command to cause the TPM to generate the one-time-password and return the one-time-password to the application. Thus, the TPM may protect the one-time-password algorithm and critical information used to create the one-time-password. For example, the TPM may never allow the parameters or the algorithm to appear in the clear outside of the TPM. In some embodiments, the resources of the TPM may be used more efficiently by treating a parent key of the one-time-password blob the same as any other TPM key. In this way, the one-time-password blob may be managed via the parent key. As a result, one-time-password functionality may be supported while using standard TPM operations for creating keys, loading and evicting keys, assigning and changing authorization for keys, certifying keys, migrating keys, etc. These and other aspects of a system utilizing one-time-passwords are discussed, for example, in commonly owned U.S. patent application Ser. No. 11/524,508, filed Sep. 21, 2006, entitled SYSTEM AND METHOD FOR SECURELY PROVISIONING AND GENERATING ONE-TIME-PASSWORDS IN A REMOTE DEVICE, the disclosure of which is incorporated by reference herein.

In some embodiments the non-TPM security functions involve generating authentication-related data for an ASF system. Here, an ASF blob may consist of parameters (e.g., a seed, a shared key, etc.) used by an algorithm (e.g., an HMAC) that generates a shared secret for a network session established between an ASF server (e.g., a management console) and an ASF client (e.g., a remote computing device). The ASF client may invoke a non-TPM command to cause the TPM to generate the shared secret value and return that value to the ASF client. Here, not only does the TPM protects the shared key as it would protect any other key, but the TPM also may perform the HMAC algorithm within the TPM. As a result, the TPM may protect the shared key by never allowing the shared key to appear in the clear outside of the TPM. In some embodiments, the resources of the TPM may be used more efficiently and securely by treating a parent key of the ASF blob the same as any other TPM key. In this way, the ASF blob may be managed via the parent key. As a result, the TPM may support ASF functionality while using standard TPM operations such as creating keys, loading and evicting keys, assigning and changing authorization for keys, certifying keys, migrating keys, etc. These and other aspects of a system utilizing one-time-passwords are discussed, for example, in commonly owned U.S. patent application Ser. No. 11/524, 515, filed Sep. 21, 2006, entitled SYSTEM AND METHOD FOR SECURING COMPUTING MANAGEMENT FUNCTIONS, the disclosure of which is incorporated by reference herein.

It should be appreciated that the various components and techniques described herein may be incorporated in system independently of the other components and techniques. For example, a system incorporating the teachings herein may include various combinations of these components and techniques. Thus, not all of the components and techniques described herein may be employed in every such system.

Different embodiments of the invention may include a variety of hardware and software processing components. In some embodiments of the invention hardware components such as controllers, state machines and/or logic are used in a system constructed in accordance with the invention. In some embodiments code such as software or firmware executing on one or more processing devices may be used to implement one or more of the described operations.

The components and functions described herein may be connected and/or coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may comprise electrical signals transmitted over a wire, light pulses transmitted through an optical medium such as an optical fiber or air, or RF waves transmitted through a medium such as air, etc. A signal may comprise more than one signal. For example, a signal may consist of a series of signals. Also, a differential signal comprises two complementary signals or some other combination of signals. A group of signals may be collectively referred to herein as a signal. Signals as discussed herein also may take the form of data. For example, in some embodiments an application program may send a signal to another application program. Such a signal may be stored in a data memory.

A wide variety of devices may be used to implement the data memories discussed herein. For example, a data memory may comprise RAM, ROM, flash memory, one-time-programmable (OTP) memory, a disk drive, or other types of data storage devices.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A trusted platform module (TPM) comprising:
a secure processor;
TPM logic configured to implement security functions complying with a TPM standard; and
non-TPM logic configured to implement security functions that are independent of the TPM standard,
wherein the TPM logic is further configured to perform key management operations in support of the security functions, implemented by the non-TPM logic, that are independent of the TPM standard, and
wherein the TPM logic and the non-TPM logic are executed by the secure processor within a security boundary established by the TPM.

2. The TPM of claim 1, wherein the security functions independent of the TPM standard are prevented from exposing, outside the security boundary, information related to the security functions that comply with the TPM standard.

3. The TPM of claim 1, wherein the security functions independent of the TPM standard comprise an encryption algorithm.

4. The TPM of claim 1, wherein the security functions independent of the TPM standard comprise an authentication function.

5. The TPM of claim 1, wherein the key management operations are invoked by TPM commands received by the TPM.

6. The TPM of claim 5, wherein the TPM commands are received via a TPM software stack.

7. The TPM of claim 5, wherein the TPM commands are passed to the TPM logic via a TPM command bus.

8. The TPM of claim 1, wherein the key management operations comprise authentication of access to a key.

9. The TPM of claim 1, wherein the key management operations comprise loading a key.

10. The TPM of claim 1, wherein the key management operations comprise evicting a key.

11. A method for adaptably processing, at a trusted platform module (TPM), commands that are compatible with a TPM standard and commands that are independent of the TPM standard, the method comprising the steps of:
(a) receiving a command;
(b) determining whether the command is compatible with the TPM standard;
(c) if so, performing a TPM function associated with the command using TPM logic executed by a secure processor within a security boundary established by the TPM; and
(d) if not, performing a non-TPM function associated with the command using non-TPM logic executed by the secure processor within the security boundary established by the TPM,
wherein the TPM logic performs key management operations in support of the command if the command is not compatible with the TPM standard.

12. The method of claim 11, further comprising the step of:
(e) returning a result to an application.

13. The method of claim 11, further comprising the step of:
(e) configuring the TPM to support the commands compatible with the TPM standard, performed before step a).

14. The method of claim 11, further comprising the step of:
(e) configuring the TPM to support the commands that are independent of the TPM standard, performed before step a).

15. A device comprising:
a trusted platform module (TPM), wherein the TPM includes:
a secure processor;
TPM logic configured to implement TPM security functions complying with a TPM standard, and
non-TPM logic configured to implement non-TPM security functions that are independent of the TPM standard,
wherein the TPM logic and the non-TPM logic are executed by the secure processor within a security boundary established by the TPM, and
wherein the TPM logic is further configured to manage cryptographic keys for the TPM security functions and cryptographic keys for the non-TPM security functions in accordance with the TPM standard; and
a memory that stores encrypted keys and encrypted data for the TPM.

16. The device of claim 15, wherein the device is a local area network (LAN)-on-motherboard (LOM).

17. The device of claim 15, wherein the device is a network interface card.

18. The device of claim 15, wherein the device further comprises:
a trusted security stack configured to receive TPM commands to invoke the TPM security functions within the TPM, TPM commands to invoke non-TPM functions within the TPM, and non-TPM commands to invoke the non-TPM functions within the TPM.

19. The device of claim 15, wherein the non-TPM security functions are prevented from exposing, outside the security boundary, information related to the TPM security functions.

20. The method of claim 11, wherein the command is prevented from exposing, outside the security boundary, information related to security functions that comply with the TPM standard if the command is not compatible with the TPM standard.

* * * * *